United States Patent Office 3,053,672
Patented Sept. 11, 1962

3,053,672
GLASS COMPOSITION
Dominick Labino, Grand Rapids, Ohio, assignor to Johns-Manville Corporation, New York, N.Y., a corporation of New York
No Drawing. Filed Dec. 19, 1960, Ser. No. 76,454
8 Claims. (Cl. 106—50)

This invention relates to a glass composition and more particularly to an improved glass composition for the manufacture of glass fibers.

Present commercial manufacturing procedures for the production of glass fibers typically comprise two general methods. One method comprises mechanically attenuating streams or filaments of molten to soft glass flowing or drawn from orifices in a glass melting furnace to produce continuous fibers or threads of fine diameter. The other general method, comprising gas attenuation, typically consists of further attenuating primary glass fibers, formed by the foregoing-mentioned mechanical drawing and attenuating techniques, with a high temperature and high velocity gas stream or jet. According to this latter procedure the high temperature of the gas softens the primary fiber and the velocity of its stream or jet further attenuates the soft continuous fiber of filaments producing a fibrous product of very fine diameter and short length which is generally known as the so-called staple or "wool" glass fiber. Thus, the effectiveness or efficiency of such current commercial manufacturing procedures comprising drawing and attenuating molten to soft glass melts, is dependent to a substantial degree upon certain properties or characteristics of the composition of the particular glass such as melting, softening, and working temperatures, breadth of the range of workable viscosities, and liquidus temperature, etc.

It is a primary object of this invention to provide a novel glass composition having improved and unique properties which render it particularly adaptable to current glass fiber manufacturing procedures, and which facilitate the same.

It is also an object of this invention to provide a glass composition having improved viscosity characteristics and very low liquidus temperature which substantially eliminates formation of crystals due to devitrification during fiber forming and attenuation.

It is a further object of this invention to provide a glass composition having a low softening point temperature and a relatively broad working range permitting ease of working and high production rates.

It is a still further object of this invention to provide a glass composition having a liquidus temperature substantially below its relatively low working temperature range, whereby the glass melt can be worked at a temperature above that where crystals form.

It is also an object of this invention to provide a glass composition and in turn glass fibers having a high degree of durability and resistance to moisture and chemical attack.

These and other objects and advantages apparent from the hereinafter detailed description are obtained by a relatively narrow range of glass compositions which include small but effective amounts of oxides of barium and zinc. The glass compositions of this invention comprise those formed by the recited components within the area defined substantially by the following percentages by weight.

| Constituents: | Range |
|---|---|
| $SiO_2$ | 46–54 |
| $B_2O_3$ | 8–13 |
| $Al_2O_3$ | 11–15 |
| $Na_2O+K_2O$ | 0.5–2.5 |
| $CaO$ | 15–22 |
| $MgO$ | 0–2 |
| $BaO$ | 1–5 |
| $ZnO$ | 1–5 |
| $CaF_2$ | 0.1–2.5 |

The compositions given above are calculated from batch and may vary insignificantly because of loss of volatile materials during melting. Also, the percentage given for the $Al_2O_3$ constituent includes any $Fe_2O_3$, $TiO_2$ or other members of this chemical group that may be included in the glass in small amounts as impurities with the batch materials.

A glass within the approximate range of the formulations given provides a melt with improved viscosity characteristics and a substantially lower liquidus temperature than those of any other glass compositions utilized in the commercial production of glass fibers, particularly continuous fibers or filaments. The low liquidus temperature or point of these glasses, i.e., about 1700° F., eliminates devitrification or formation of crystals during fiber formation and attenuation by permitting working of the molten to soft material at temperatures where crystals do not form. Moreover, these glasses generally exhibit very slow crystal growth in comparison to commercial glass fiber compositions. The inclusion of small but effective quantities of both BaO and ZnO in the glass compositions of this invention results in these very desirable forming and working properties as well as providing compositions having good resistance and durability to moisture and/or chemical attack when in the form of fine fibers.

The following examples of glass compositions and of fibers composed of the same are given for the purpose of illustration and comparison with the prior art, and are simply exemplary and not to be construed as limiting the novel glass composition or glass fibers of this invention:

| Constituents | Examples | | |
|---|---|---|---|
| | 1 | 2 | 3 |
| $SiO_2$ | 48.0 | 48.0 | 48.9 |
| $B_2O_3$ | 12.4 | 12.4 | 11.5 |
| $Al_2O_3$ | 13.9 | 13.9 | 14.0 |
| $Na_2O+K_2O$ | 1.7 | 1.7 | 1.0 |
| $CaO$ | 18.8 | 16.8 | 20.2 |
| $MgO$ | 0.3 | 0.3 | 0.3 |
| $BaO$ | 2.0 | 2.0 | 2.1 |
| $ZnO$ | 1.0 | 3.0 | 1.1 |
| $CaF_2$ | 1.8 | 1.8 | 1.0 |
| Softening point, °F | 1,435 | 1,431 | 1,468 |
| Liquidus Temp., °F | 1,700 | 1,765 | No crystals. |

Essential working or forming properties of typical glass compositions of this invention, identified as the compositions of Examples 1, 2 and 3, are given in Table I for comparison with the like properties of an extensively employed commercial glass fiber composition having the following formula, in percentage by weight.

Constituents:
- $SiO_2$ — 53.0
- $B_2O_3$ — 10.0
- $Al_2O_3$ — 14.3
- $Na_2O+K_2O$ — 0.5
- $CaO$ — 14.8
- $MgO$ — 4.4
- $CaF_2$ — 3.0

Table I

|  | 1 | 2 | 3 | Commercial Glass Fiber Composition |
|---|---|---|---|---|
| Softening Point, °F | 1,435 | 1,431 | 1,468 | 1,550 |
| Liquidus Temp., °F | 1,700 | 1,765 | No crystals | 2,050 |
| Chemical Durability, 5μ Fiber in Water: | | | | |
| Percent Wt. Loss | 1.30 | No Data | 1.39 | 1.12 |
| Ω Water | 14,700 | | | 26,200 |

A further useful and improved property of the glass compositions of this invention is the relative light transmission of fibers composed of the same when employed in reinforced polyester plastic materials. The percent light transmission through a ⅛" thick reinforced polyester sheet composed of 40% by weight of resin and 60% by weight of a glass fiber composed of the composition of Example 1 is 78 to 82%, whereas the transmission for an identical product containing a like proportion of glass fibers of the commercial formulation given hereinbefore is 65 to 78%.

The durability of the glass composition of this invention in the form of fine diameter fibers to chemical attack by water and the significant effect of the essential ZnO constituent upon the composition in this respect is demonstrated by submerging several samples of glass fiber products of 1 micron average diameter and of compositions differing only as to the relative proportions of ZnO and CaO in water for a period of 1 hour and determining the resultant weight loss in percent by weight. The glass fiber compositions and the effects of the same are as follows:

Table II

| Constituents | +1% CaO and −1% ZnO From Example 1 | Example No. 1, 1% ZnO | −2% CaO and +2% ZnO From Example 1 |
|---|---|---|---|
| $SiO_2$ | 48.0 | 48.0 | 48.0 |
| $B_2O_3$ | 12.4 | 12.4 | 12.4 |
| $Al_2O_3$ | 13.9 | 13.9 | 13.9 |
| $Na_2O+K_2O$ | 1.7 | 1.7 | 1.7 |
| $CaO$ | 19.8 | 18.8 | 16.8 |
| $MgO$ | 0.3 | 0.3 | 0.3 |
| $BaO$ | 2.0 | 2.0 | 2.0 |
| $ZnO$ | | 1.0 | 3.0 |
| $CaF_2$ | 1.8 | 1.8 | 1.8 |
| Percent Weight Loss 1 hr. in water | 2.4 | 1.9 | 1.4 |

From the foregoing it is apparent that the ZnO component contributes substantially to the durability when it replaces CaO which is usually considered a stabilizing component in glass of this type.

It should be understood that the present disclosure is for the purpose of illustration only and that this invention includes all modifications and equivalents which fall within the scope of the appended claims.

What I claim is:

1. A glass consisting essentially of the following in percent by weight:

- $SiO_2$ — 46–54
- $B_2O_3$ — 8–13
- $Al_2O_3$ — 11–15
- $Na_2O+K_2O$ — 0.5–2.5
- $CaO$ — 15–22
- $MgO$ — 0–2
- $BaO$ — 1–5
- $ZnO$ — 1–5
- $CaF_2$ — 0.1–2.5

2. A glass consisting essentially of the following in percent by weight:

- $SiO_2$ — 48.0
- $B_2O_3$ — 12.4
- $Al_2O_3$ — 13.9
- $Na_2O+K_2O$ — 1.7
- $CaO$ — 18.8
- $MgO$ — 0.3
- $BaO$ — 2.0
- $ZnO$ — 1.0
- $CaF_2$ — 1.8

3. A glass consisting essentially of the following in percent by weight:

- $SiO_2$ — 48.0
- $B_2O_3$ — 12.4
- $Al_2O_3$ — 13.9
- $Na_2O+K_2O$ — 1.7
- $CaO$ — 16.8
- $MgO$ — 0.3
- $BaO$ — 2.0
- $ZnO$ — 3.0
- $CaF_2$ — 1.8

4. A glass consisting essentially of the following in percent by weight:

- $SiO_2$ — 48.9
- $B_2O_3$ — 11.5
- $Al_2O_3$ — 14.0
- $Na_2O+K_2O$ — 1.7
- $CaO$ — 20.2
- $MgO$ — 0.3
- $BaO$ — 2.1
- $ZnO$ — 1.1
- $CaF_2$ — 1.0

5. A glass in the form of fine fibers consisting essentially of the following in percent by weight:

- $SiO_2$ — 46–54
- $B_2O_3$ — 8–13
- $Al_2O_3$ — 11–15
- $Na_2O+K_2O$ — 0.5–2.5
- $CaO$ — 15–22
- $MgO$ — 0–2
- $BaO$ — 1–5
- $ZnO$ — 1–5
- $CaF_2$ — 0.1–2.5

6. A glass in the form of fine fibers consisting essentially of the following in percent by weight:

- $SiO_2$ — 48.0
- $B_2O_3$ — 12.4
- $Al_2O_3$ — 13.9
- $Na_2O+K_2O$ — 1.7
- $CaO$ — 18.8
- $MgO$ — 0.3
- $BaO$ — 2.0
- $ZnO$ — 1.0
- $CaF_2$ — 1.8

7. A glass in the form of fine fibers consisting essentially of the following in percent by weight:

| | |
|---|---|
| $SiO_2$ | 48.0 |
| $B_2O_3$ | 12.4 |
| $Al_2O_3$ | 13.9 |
| $Na_2O+K_2O$ | 1.7 |
| CaO | 16.8 |
| MgO | 0.3 |
| BaO | 2.0 |
| ZnO | 3.0 |
| $CaF_2$ | 1.8 |

8. A glass in the form of fine fibers consisting essentially of the following in percent by weight:

| | |
|---|---|
| $SiO_2$ | 48.9 |
| $B_2O_3$ | 11.5 |
| $Al_2O_3$ | 14.0 |
| $Na_2O+K_2O$ | 1.0 |
| CaO | 20.2 |
| MgO | 0.3 |
| BaO | 2.1 |
| ZnO | 1.1 |
| $CaF_2$ | 1.0 |

References Cited in the file of this patent

UNITED STATES PATENTS

| | | |
|---|---|---|
| 2,640,784 | Tiede et al. | June 2, 1953 |
| 2,877,124 | Welsch | Mar. 10, 1959 |
| 2,882,173 | Welsch | Apr. 14, 1959 |
| 2,961,328 | Babcock et al. | Nov. 22, 1960 |